United States Patent
Fine et al.

(10) Patent No.: US 9,195,492 B2
(45) Date of Patent: Nov. 24, 2015

(54) SECURE SYSTEM TIME REPORTING

(71) Applicant: EMPIRE TECHNOLOGY DEVELOPMENT LLC, Wilmington, DE (US)

(72) Inventors: Kevin Fine, Yverdon-les-bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 324 days.

(21) Appl. No.: 13/877,216

(22) PCT Filed: Oct. 25, 2012

(86) PCT No.: PCT/US2012/061898
§ 371 (c)(1),
(2) Date: Apr. 1, 2013

(87) PCT Pub. No.: WO2014/065801
PCT Pub. Date: May 1, 2014

(65) Prior Publication Data
US 2014/0123139 A1     May 1, 2014

(51) Int. Cl.
*G06F 9/455* (2006.01)
*G06F 1/12* (2006.01)
*G06F 1/04* (2006.01)
*G06F 21/53* (2013.01)
*G06F 21/55* (2013.01)

(52) U.S. Cl.
CPC ........ *G06F 9/45558* (2013.01); *G06F 9/45533* (2013.01); *G06F 21/53* (2013.01); *G06F 21/554* (2013.01); *G06F 21/556* (2013.01)

(58) Field of Classification Search
None
See application file for complete search history.

(56) References Cited

U.S. PATENT DOCUMENTS

| | | |
|---|---|---|
| 5,761,715 A | 6/1998 | Takahashi |
| 7,418,733 B2 | 8/2008 | Connary et al. |
| 8,170,859 B1 | 5/2012 | Christensson |
| 8,195,957 B2 | 6/2012 | Dolgunov et al. |
| 8,220,031 B2 | 7/2012 | Leterrier |

(Continued)

FOREIGN PATENT DOCUMENTS

| | | |
|---|---|---|
| WO | PCT/US12/61898 | 10/2012 |
| WO | 2013172913 A2 | 11/2013 |

OTHER PUBLICATIONS

Brockmeier; Containers vs. Hypervisors: Choosing the Best Virtualization Technology, Linux.com, Apr. 13, 2010.*

(Continued)

*Primary Examiner* — Mengyao Zhe
*Assistant Examiner* — Bing Zhao
(74) *Attorney, Agent, or Firm* — Jensen & Puntigam, PS

(57) ABSTRACT

Technologies related to secure system time reporting are generally described. In some examples, responses to some system time requests may be manipulated to prevent leaking information that may be of interest for timing attacks, while responses to other system time requests need not be manipulated. In particular, responses to system time requests that are separated from a previous system time request by a predetermined minimum value, or less, may be manipulated. Responses to system time requests that are separated from a previous system time request by more than the predetermined minimum value need not be manipulated. Furthermore, secure system time reporting may be adaptively deployed to servers in a data center on an as-needed basis.

27 Claims, 6 Drawing Sheets

(56) References Cited

U.S. PATENT DOCUMENTS

| | | | |
|---|---|---|---|
| 8,359,488 B2* | 1/2013 | Costa | 713/400 |
| 2008/0155679 A1 | 6/2008 | Sebot | |
| 2009/0010424 A1 | 1/2009 | Qi | |
| 2011/0078688 A1 | 3/2011 | Zhai | |
| 2011/0214187 A1 | 9/2011 | Wittenstein et al. | |
| 2012/0266221 A1 | 10/2012 | Castelluccia et al. | |
| 2013/0232577 A1 | 9/2013 | Watters et al. | |
| 2013/0297832 A1 | 11/2013 | Ahmad et al. | |

OTHER PUBLICATIONS

International Searching Authority, International Search Report and Written Opinion of the International Searching Authority for PCT/US12/61898, Jan. 11, 2013.
Vattikonda, Eliminating Fine Grained Timers in Xen, paper, Oct. 21, 2011, 6 pages.
Coppens, Practical Mitigations for Timing-Based Side-Channel Attacks on Modern x86 Processors, abstract, May 17, 2009, 1 page.
Eddy, Cloud Computing Growth Hampered by Cost, Security Concerns: Survey, eWeek post, Jul. 22, 2011, 1 page.
Zhou, Security and Privacy in Cloud Computing: A Survey, abstract, Nov. 1, 2010, 2 pages.
Tromer, Efficient Cache Attacks on AES, and Countermeasures, Journal of Cryptology paper, Jul. 23, 2009, 35 pages.
Percival, Cache Missing for Fun and Profit, Paper Presented at BSDCan 2005, May 2005, 13 pages.
McMillan, Researchers find a new way to attack the cloud, Computerworld post, Sep. 3, 2009, 2 pages.
Izu, Improved Elliptic Curve Multiplication Methods Resistant against Side Channel Attacks, article in Progress in Cryptology—Indocrypt 2002, pp. 296-313, 2002, 19 pages.
Aviram, Determinating Timing Channels in Compute Clouds, paper, Jul. 25, 2010, 6 pages.
Hu, Reducing Timing Channels with Fuzzy Time, paper, 1991, 13 pages.
Ristenpart, Hey, You, Get Off of My Cloud: Exploring Information Leakage in Third-Party Compute Clouds, paper, Nov. 9, 2009, 14 pages.
"Viddler," accessed at web.archive.org/web/20131221051343/http://www.viddler.com/v/c830faa3, uploaded on Feb. 22, 2008, pp. 3.
"File:Intel Nehalem arch.svg," Wikipedia, Accessed at http://web.archive.org/web/20111120050249/http://en.wikipedia.org/wiki/File:Intel_Nehalem_arch.svg, Accessed on Mar. 19, 2015, pp. 4.
"HV_CPU_Counter enumeration," accessed at web.archive.org/web/20120707024418/http://msdn.microsoft.com/en-us/library/windows/hardware/ff539930(v=vs.85).aspx, accessed on Mar. 19, 2015, pp. 3.
"Intel® 64 and IA-32 Architectures Software Developer Manuals," accessed at web.archive.org/web/20121023112102/http://www.intel.com/content/www/us/en/processors/architectures-software-developer-manuals.html, accessed on Mar. 19, 2015, pp. 3.
"Using the RDTSC Instruction for Performance Monitoring," Pentium II Processor, Application Notes, pp. 1-12 (Jan. 7, 1998).
Aciiçmez, O., "Yet Another MicroArchitectural Attack: Exploiting I-cache," Proceedings of the 2007 ACM workshop on Computer security architecture, pp. 11-18 (2007).
Goodin, D., "Virtual machine used to steal crypto keys from other VM on same server," posted on Nov. 6, 2012, accessed at web.archive.org/web/20130205134534/http://arstechnica.com/security/2012/11/crypto-keys-stolen-from-virtual-machine, posted on Nov. 6, 2012, pp. 4.
Gueron, S., "Intel® Advanced Encryption Standard (AES) New Instructions Set," White Paper, Intel Corporation, pp. 1-94 (Sep. 2012).
International Search Report and Written Opinion in International Patent Application No. PCT/US2013/73140 mailed May 23, 2014.
Ion, I. et al, "Home is safer than the cloud! Privacy Concerns for Consumer Cloud Storage," Proceedings of the Seventh Symposium on Usable Privacy and Security, ACM, pp. 20 (Jul. 14-16, 2011).
Kim, T., et al., "STEALTHMEM: system-level protection against cache-based side channel attacks in the cloud," Proceedings of the 21st USENIX conference on Security symposium, USENIX Association, pp. 1-16, (2012).
Kong, J., et al., "Deconstructing New Cache Designs for Thwarting Software Cache-based Side Channel Attacks," CSAW '08 Proceedings of the 2nd ACM Workshop on Computer Security Architectures, pp. 25-34 (Oct. 31, 2008).
Kong, J., et al., "Hardware-software integrated approaches to defend against software cache-based side channel attacks," IEEE 15th International Symposium on High Performance Computer Architecture, HPCA, pp. 393-404 (Feb. 14-18, 2009).
Köpf, B., et al., "Automatic quantification of cache side-channels," Article, Computer Aided Verification, Computer Aided Verification Lecture Notes in Computer Science, 20 pages (2012).
Muller, T., et al., "AESSE: a cold-boot resistant implementation of AES," EUROSEC '10 Proceedings of the Third European Workshop on System Security, pp. 42-47 (2010).
Osvik, D.A., et al., "Cache Attacks and Countermeasures: the case of AES," Article, Topics in Cryptology, 25 pages, Aug. 14, 2005.
Voellm, T., "Hyper-V Performance Counters—Part three of many—"Hyper-V Hypervisor Logical Processors" counter set," accessed at https://web.archive.org/web/20120904034645/http://blogs.msdn.com/b/tvoellm/archive/2008/05/09/hyper-v-performance-counters-part-three-of-many-hyper-v-logical-processors-counter-set.aspx, posted on May 9, 2008, pp. 2.
Wang, Z., and Lee, R. B., "New cache designs for thwarting software cache-based side channel attacks," Proceedings of the 34th International Symposium on Computer Architecture, vol. 35, No. 2, pp. 494-505 (Jun. 9-13, 2007).
West, R., and Zaroo, p., "Online Cache Modeling for Commodity Multicore Processors," ACM SIGOPS Operating Systems Review, vol. 44, Issue 4, pp. 19-29 (Dec. 2010).
Zhang, Y., et al, "Cross-VM side Channels and Their Use to Extract Private Keys," Proceedings of the 2012 ACM conference on Computer and communications security. ACM, pp. 305-316 (Oct. 16-18, 2012).

* cited by examiner

SECURE SYSTEM TIME REPORTING

CROSS-REFERENCE TO RELATED APPLICATION

This is a U.S. National Stage Application filing under 35 U.S.C. §371 of International Application PCT/US12/61898, entitled "SECURE SYSTEM TIME REPORTING", filed on Oct. 25, 2012, which is incorporated by reference herein in its entirety.

BACKGROUND

Unless otherwise indicated herein, the materials described in this section are not prior art to the claims in this application and are not admitted to be prior art by inclusion in this section.

Timing attacks are a form of side channel attack in which an attacker attempts to compromise a target by analyzing time used to carry out target operations. Every logical operation in a computer takes time to execute, and execution time for target operations can differ based on input to the target operations. With precise measurements of the time for target operations, the attacker can work backwards to ascertain target inputs.

Timing attacks may occur in a wide variety of settings. In general, settings involving multiple processes that share computing hardware are particularly vulnerable to timing attacks. For example, a computer may execute several processes, one of which may launch timing attacks on the others. In another example, a computer may be equipped with a Virtual Machine Manager (VMM), also referred to herein as a "hypervisor", which is configured to host several Virtual Machines (VMs), also referred to herein as "guest operating systems (OSs)". One of the guest OSs may launch timing attacks on the others.

Timing attacks are particularly relevant in today's cloud computing and data center environments. Mainstream computer use is evolving from individually managed, stand-alone computing devices to connected devices that access software and/or data via a network connection. "Cloud computing" refers to a computing model in which computing resources may be accessed via a network connection. Resources available from the network may be referred to as "in the cloud".

Behind a network connection, a "cloud" may comprise professionally managed hardware and software. Data center/infrastructure providers may supply hardware infrastructure itself, e.g., racks and rows of servers comprising processors, memory, cabling, cooling systems, raw storage, firewalls, and load balancers. In some instances infrastructure itself may be provided as a service, such as the "Elastic Compute Cloud" (EC2) provided by AMAZON®, and MICROSOFT WINDOWS AZURE®. Furthermore, "Platform as a Service" (PaaS) providers may supply platform layers that use infrastructure provider hardware. Platform layers may include, for example, computing platforms such as OSs, programming language execution environments, databases, and web servers. "Software as a Service" (SaaS) providers may supply software layers that use platform providers' platforms. SaaS software layers may include, for example, application software implementing network services that can be made available in a cloud to client applications operated by end users and/or other network services.

To make better use of resources, cloud computing providers may multiplex several VMs from different customers on a single physical machine. This practice opens the danger of side channel attacks, such as timing attacks, from malicious customers. Security is an important concern of customers considering deployment to the cloud.

SUMMARY

The present disclosure generally describes technologies including devices, methods, and computer readable media relating to secure system time reporting. Some example methods may comprise methods for secure system time reporting by a hypervisor in a computing device. The hypervisor may trap a current system time request from a guest OS; request a current system time; and compare the current system time to a previously requested system time. When a difference between the current system time and the previously requested system time is at or below a predetermined minimum value, the hypervisor may return the previously requested system time in response to the current system time request. When a difference between the current system time and the previously requested system time is above the predetermined minimum value, the hypervisor may return the current system time in response to the current system time request.

Some example methods may comprise methods for securing a data center from side channel attacks. Methods may include detecting, in the data center, execution of guest OSs associated with more than one data center customer in a same data center server, and configuring a hypervisor in the data center server to conduct secure system time reporting when execution of guest OSs associated with more than one data center customer is detected in the data center server. The hypervisor may be configured to perform secure system time reporting methods described herein.

Computing devices and computer readable media having instructions implementing the various technologies described herein are also disclosed. Example computer readable media may comprise non-transitory computer readable storage media having computer executable instructions executable by a processor, the instructions that, when executed by the processor, cause the processor to carry out any combination of the various methods provided herein. Example computing devices may include a server comprising a processor, a memory, and a hypervisor or data center security module configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
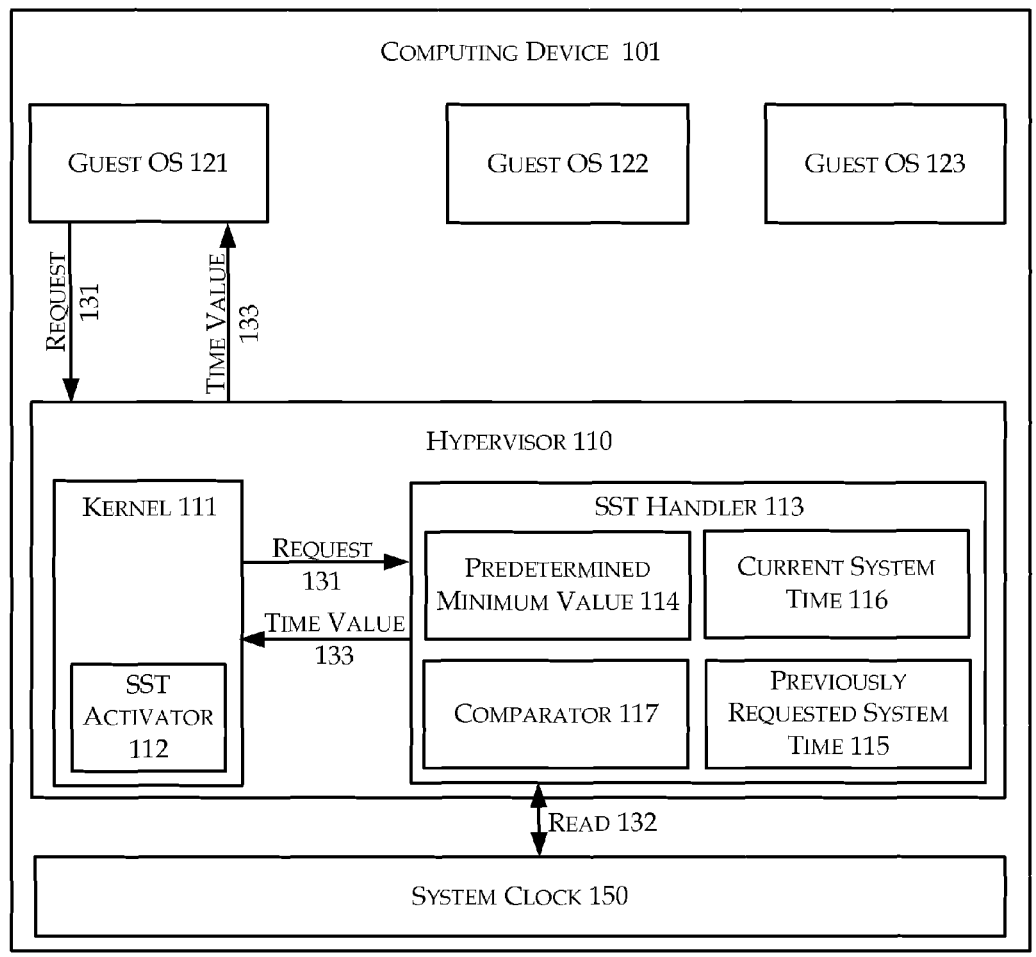
FIG. 1 is a block diagram illustrating an example computing device configured for secure system time reporting.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including methods, devices, systems and/or computer readable media deployed therein relating to secure time reporting. In some examples, responses to some time requests may be manipulated to prevent leaking information that may be of interest for timing attacks, while responses to other time requests need not be manipulated. In particular, responses to time requests that are separated from a previous time request by a predetermined minimum value, or less, may be manipulated. Responses to time requests that are separated from a previous time request by more than the predetermined minimum value need not be manipulated. Furthermore, secure time reporting may be adaptively deployed at servers in a data center on an as-needed basis.

Some example methods may comprise methods for securing a data center from side channel attacks. Methods may include detecting, in the data center, execution of guest OSs associated with more than one data center customer in a same data center server, and configuring a hypervisor in the data center server to conduct secure system time reporting when execution of guest OSs associated with more than one data center customer is detected in the data center server.

In some embodiments, the hypervisor may optionally be configured to detect execution of more than one guest OS in a computing device, and to conduct secure system time reporting when execution of more than one guest OS is detected. It will be appreciated that the computing device may be deployed within a data center or elsewhere. In some embodiments, e.g., when the computing device comprises a server in a data center, the hypervisor may be configured to detect execution of guest OSs associated with more than one data center customer in the computing device, and to conduct secure system time reporting when execution of guest OSs associated with more than one data center customer is detected.

Some example methods may comprise methods for secure system time reporting by a hypervisor in a computing device. An example hypervisor may comprise a soft Time Stamp Counter (softtsc) type kernel, or a kernel that is otherwise configured and/or configurable to intercept calls to a system timer in the computing device and to manipulate system timer responses. The hypervisor may be configured to trap a current system time request, such as, for example, a read timestamp command (RDTSC), from a guest OS. The hypervisor may be configured to request a current system time in response to the current system time request, to compare the current system time to a previously requested system time, and to determine, based on the comparison, whether to modify current system time output provided to the guest OS in response to the current system time request.

In some embodiments, when a difference between the current system time and the previously requested system time is at or below a predetermined minimum value, the hypervisor may be configured to return the previously requested system time in response to the current system time request. When the difference between the current system time and the previously requested system time is above the predetermined minimum value, the hypervisor may return the current system time in response to the current system time request.

In some embodiments, when a difference between the current system time and the previously requested system time is at or below a predetermined minimum value, the hypervisor may be configured to return a time value other than the current system time in response to the current system time request. The returned time value other than the current system time may comprise any time value, e.g., a time value as may be determined using "fuzzy timer" techniques, or the previously requested system time as described above. When the difference between the current system time and the previously requested system time is above the predetermined minimum value, the hypervisor may return the current system time in response to the current system time request.

Time values may be measured in units of time or processor clock cycles. The terms "processor clock cycles", "clock cycles", or "cycles" may be used interchangeably herein to refer to processor clock cycles, that is, pulses of the oscillator that sets the tempo of the processor. The number of cycles per second is known as the clock speed, which is generally measured in megahertz (MHz) or gigahertz (GHz). Processors may execute one or more instructions per clock cycle, as is appreciated by those of skill in the art.

For example, in some embodiments the predetermined minimum value may comprise an amount of time in a range of about 0.15 to 0.45 microseconds (µS). In some embodiments, the predetermined minimum value may comprise an amount of time in a range of time corresponding to about 750 cycles to about 1250 cycles by a processor in the computing device. A wide range of values may be appropriate for use as the predetermined minimum value, depending upon the setting in which particular embodiments are deployed, the types of timing attacks to be prevented and the ranges at which system time manipulations may have adverse consequences. In some embodiments, the predetermined minimum value may comprise an amount of time generally corresponding to any amount of time less than a time to process about 10,000 cycles by a processor in the computing device.

Example side channel timing attacks which may be addressed by embodiments of this disclosure include, but are not limited to, attacks using precision timers to glean information from cache accesses and processing times of co-resident processes. Example attacks have stolen keys from the widely used Advanced Encryption Standard (AES) in just 65 milliseconds (mS) of observations. See E. Tromer, D. A. Osvik, A. Shamir, "*Efficient cache attacks on AES, and countermeasures*", International Association for Cryptologic Research, 2009. Other example attacks have also stolen 310 bits out of each 512-bit exponent of a Rivest, Shamir, and Adleman (RSA) key during one key observation. See C. Percival, "*Cache missing for fun and profit*", presented at BSDCan 2005, May 2005. Cache timing attacks can also provide information on keystroke timing to extract passwords as well as count users and the like.

In one specific cache timing attack, described in C. Percival, "Cache missing for fun and profit", cited above, RSA operations were attacked in an environment comprising an Open Secure Sockets Layer (OpenSSL). A spy process was running co-resident with OpenSSL on a hyper threaded Pentium 4 processor. Because the co-resident processes shared the Level 1 (L1) cache, the spy process could reload the L1 cache when it took control of the processor. By measuring the cache reload time, the spy process could infer how much of the L1 cache was used by RSA operations. RSA decryption uses a sequence of modular squaring and modular multiplications, which can be distinguished by differences in measured cache reload times. Cache reload times are typically in the range from about 120 to about 170 processor cycles. From the measured cache reload times, the spy process could detect the sequence of RSA operations, allowing the spy process to decrypt about 200 bits out of each 512 bit exponent. This is one of a number of cache timing attack techniques that have been demonstrated to work with co-resident processes that share hardware.

To prevent cache timing attacks and/or other types of timing attacks, some solutions may attempt to either eliminate or reduce the resolution of system timers. Reduced resolution timers may be referred to as fuzzy timers. However, many system processes depend upon system timers, and reducing the accuracy of system timers can cause an OS or a hypervisor to freeze, thereby creating unacceptable instability. For example, in some cases VM freezing may derive from clock alteration impacts, such as the impact of fuzzy timers, on events that use clocks of 10,000 to 10,000,000 cycles. Instability due to clock alterations impacting time/cycle values within other ranges is also possible.

The above described cache timing attack relies upon measuring times that are separated from a previous time request by an amount equal to or less than a predetermined minimum value. Successfully measuring times to load a cache involves measuring times that are separated by an amount in the range from about 100-200 processor cycles. This range is below an example predetermined minimum value of 201 processor cycles or more, e.g., a predetermined minimum value of 250 processor cycles, a predetermined minimum value of 1000 processor cycles, or another predetermined minimum value which may be selected for particular embodiments as appropriate. Many other timing attacks, which may occur in other settings, may also rely upon measuring times that are separated from a previous time request by an amount equal to or less than a predetermined minimum value, and so it will be appreciated that this disclosure is not limited to addressing cache timing attacks.

In some embodiments, system timers and/or related systems may be configured to manipulate returned system times to prevent accurate measurement of times that are separated from a time provided in response to a previous system time request by an amount equal to or less than a predetermined minimum value, to prevent timing measurements in a range needed for timing attacks. For example, in the case of cache timing attack such as described above, if system timers and/or related systems can be configured to manipulate returned system times to prevent accurate measurement, or in some embodiments, to prevent any measurement, in the range from 0-1000 processor cycles, then accurate measurements on the scale of single cache loads may be prevented, and cache timing attacks may also be prevented.

Embodiments of this disclosure may therefore predetermine a minimum value operable to hide sensitive timing information from would-be attackers, and to manipulate returned system times to prevent accurate measurement in the range at or below the predetermined minimum value. Meanwhile, embodiments of this disclosure may allow system timers and/or related systems to function normally for valid uses, namely uses that entail system time measurements in the range outside the predetermined minimum value. VM freezing deriving from clock alteration impacts on events that use clocks of 10,000 to 10,000,000 cycles, such as described above, may thereby be avoided, along with avoiding any other problems that may arise as a result of manipulating returned system times that are separated from a time provided in response to a previous system time request by an amount more than a predetermined minimum value.

In some embodiments, technologies described herein may defend against timing based side channel attacks in hypervisor managed VMs. Embodiments of this disclosure may use hypervisor trapping capabilities to adjust reporting of system time in a way that reduces or eliminates side channel attacks while providing substantially unaltered outputs to most or all necessary VM functions.

On the widely used Intel x86 type platforms, access to the system timer may be through the read timestamp (RDTSC) instruction. Embodiments of this disclosure may make use of the RDTSC instruction, however this disclosure is not limited to using the RDTSC instruction and it will appreciated that other, similar instructions on other platforms can be utilized in its place.

In some embodiments, a hypervisor may be configured to trap and emulate the RDTSC instruction, and to return a modified value in some circumstances. For example, hypervisors such as those known as Xen® hypervisors may include a softtsc kernel option. This option allows the hypervisor to execute custom code when the RDTSC command is called by a guest OS. Xen® hypervisors are one example of hypervisors that may be configured to execute custom code when the RDTSC command is called, however embodiments of this disclosure may make use of any hypervisor that can trap and emulate responses to system timer requests.

In some embodiments, the custom code may be configured to modify values returned in response to trapped RDTSC instructions, so that RDTSC instructions do not return timer differences between 0 and a predetermined minimum value of clock cycles, which predetermined minimum value may be referred to herein as "CountDelMin". In some embodiments, CountDelMin may for example be a number in the range of 200-1800 cycles, which for a 3 Gigahertz (GHz) processor clock corresponds to around 0.07-0.60 µS. The custom code may be configured to return timer differences greater than CountDelMin unchanged, and therefore, RDTSC may be unaffected if called at intervals further apart than the predetermined minimum value. CountDelMin may be established such that valid OS functions, for example, Transmission Control Protocol (TCP) packet transmission times, normally measure times longer than CountDelMin and as a result would not be affected by RDTSC modifications applied by the custom code.

FIG. 1 is a block diagram illustrating an example computing device configured for secure system time reporting, arranged in accordance with at least some embodiments of the present disclosure. FIG. 1 includes a computing device 101, including a guest OS 121, a guest OS 122, a guest OS 123, a hypervisor 110, and a system clock 150. Hypervisor 110 includes a kernel 111 and a Secure System Time (SST) handler 113. Kernel 111 includes a SST activator 112. SST handler 113 includes a predetermined minimum value 114, a previously requested system time 115, a current system time 116, and a comparator 117. Three guest OSs are illustrated for simplicity of explanation; however it will be appreciated that more or fewer guest OSs may be present.

In general, guest OS 121 may make a current system time request 131 to hypervisor 110. When secure system time reporting is active, kernel 111 may be configured to trap system time request 131 and forward system time request 131 to SST handler 113. SST handler 113 may be configured to read current system time via a read operation 132 with system clock 150. SST handler 113 may be configured to store a current system time from read operation 132 as current system time 116. Comparator 117 may be configured to compare current system time 116 with previously requested system time 115. Previously requested system time 115 may comprise a previous time value returned to guest OS 121, e.g., in response to a previous request from guest OS 121. When a difference between current system time 116 and previously requested system time 115 is more than predetermined minimum value 114, SST handler 113 may be configured to return previously requested system time 115 to kernel 111 as a time value 133. When a difference between current system time 116 and previously requested system time 115 is at or below predetermined minimum value 114, SST handler 113 may be configured to return current system time 116 to kernel 111 as time value 133. Hypervisor 110 may be configured to return time value 133 to guest OS 121 in response to system time request 131.

In some embodiments, SST activator 112 may be configured to activate and deactivate secure system time reporting at computing device 101. In some embodiments, SST activator 112 may be configured to activate secure system time reporting by loading SST handler 113 and configuring kernel 111 to direct system time requests, such as system time request 131, to SST handler 113. For example, kernel 111 may be configured to trap system time requests and call SST handler 113 to process system time requests. SST activator 112 may be configured to deactivate secure system time reporting by terminating SST handler 113 and configuring kernel 111 to handle system time requests natively, without calling SST handler 113.

In some embodiments, SST activator 112 may be configured to activate and deactivate secure system time reporting substantially simultaneously for all guest OSs 121, 122, and 123 at computing device 101. In some embodiments, SST activator 112 may be configured to activate and deactivate secure system time reporting for selected guest OSs, e.g., for guest OS 121, individually.

In some embodiments, hypervisor 110 and/or SST handler 113 may be configured to load predetermined minimum value 114 and/or previously requested system time 115 as part of OS context for each guest OS 121, 122, and 123, or to otherwise use predetermined minimum values and/or previously requested system times that may be unique to each guest OS. In some embodiments, SST handler 113 may be configured to load a saved previously requested system time 115, or otherwise reset previously requested system time 115 in connection with context switches between guest OSs by hypervisor 110. This approach may be beneficial in preventing interactions between OSs 121, 122, and 123. Embodiments in which previously requested system time 115 comprises a time value reported to a first OS, such as OS 123, SST handler 113 uses previously requested system time 115 to determine time value 133 in connection with reporting time value 133 in response to request 131 from a second guest OS, such as guest OS 121, are also within the scope of this disclosure.

In some embodiments, SST activator 112 may be configured to activate or deactivate secure system time reporting in response to instructions from a data center manager device (not shown in FIG. 1). In some embodiments, SST activator 112 may be configured to activate or deactivate secure system time reporting in response to detection by hypervisor 110 of conditions warranting secure system time reporting, which conditions may vary with different embodiments. In some embodiments, SST activator 112 may be omitted and computing device 101 may be configured with active secure system time reporting, without an option to deactivate secure system time reporting. In some embodiments, SST activator 112 may be configured to activate or deactivate secure system time reporting in response to instructions received from a human interface configured for manual adjustment of hypervisor settings.

In embodiments in which SST activator 112 may be configured to activate or deactivate secure system time reporting in response to instructions from a data center manager device, the data center manager device may for example be configured to assign guest OSs to particular servers within a data center. When conditions warrant secure system time reporting by computer 101, the data center manager device may be configured to notify SST activator 112 to activate secure system time reporting. When conditions do not warrant secure system time reporting by computer 101, the data center manager device may be configured to notify SST activator 112 to deactivate secure system time reporting.

In embodiments in which SST activator 112 may be configured to activate or deactivate secure system time reporting in response to detection by hypervisor 110 of conditions warranting secure system time reporting, when conditions warrant secure system time reporting by computer 101, hypervisor 110 may be configured to notify SST activator 112 to activate secure system time reporting. When conditions do not warrant secure system time reporting by computer 101, hypervisor 110 may be configured to notify SST activator 112 to deactivate secure system time reporting.

Conditions may warrant secure system time reporting by computer 101 for example when more than one guest OS is assigned to computer 101 for simultaneous processing of multiple guest OSs, such as guest OS 121, guest OS 122, and guest OS 123, or for example when guest OSs associated with more than one data center customer are assigned to computer 101, such as when guest OS 121 and guest OS 122 are associated with a first data center customer, and guest OS 123 is associated with a second, different data center customer. Whenever more than one guest OS is simultaneously running in computer 101, there is a risk of a side channel attack by one of the guest OSs on the other. The risk of a side channel attack increases when the multiple OSs are associated with different data center customers.

Conversely, conditions may not warrant secure system time reporting by computer 101 for example when guest OS 121 is assigned to computer 101 without other guest OSs such as guest OS 122 and guest OS 123, or when guest OS 121, guest OS 122, and guest OS 123 are associated with a same data center customer. SST activator 112 may be configured to deactivate secure system time reporting for example when guest OS 122 and guest OS 123 are terminated or migrated to a computer other than computer 101 in the data center, leaving guest OS 121 in computer 101. Deactivating secure system time reporting may eliminate the computational overhead associated with secure system time reporting when conditions indicate that secure system time reporting is unnecessary or otherwise unwarranted.

When secure system time reporting is active at computing device 101, kernel 111 may be configured to direct system time requests, such as system time request 131, to SST handler 113. For example, kernel 111 may be configured to trap system time request 131 and call SST handler 113 to process system time request 131. Example system time requests may include, but are not limited to, RDTSC requests as described above.

It will be appreciated with the benefit of this disclosure that a variety of configuration options are available for interactions between guest OS 121, hypervisor 110, kernel 111, SST handler 113, and system clock 150. In some embodiments, the interactions may proceed as illustrated in FIG. 1, that is, kernel 111 may forward system time request 131 to SST handler 113, SST handler 113 may perform read 132, SST handler 113 may provide time value 133 to kernel 111, and kernel 111 may forward time value 133 to guest OS 121. In some embodiments, kernel 111 may perform read 132 and forward current system time 116 (instead of system time request 131) to SST handler 113, SST handler 113 may provide time value 133 to kernel 111, and kernel 111 may forward time value 133 to guest OS 121. In some embodiments, SST handler 113 may provide time value 133 to guest OS 121, bypassing kernel 111. In some embodiments, system clock 150 may be implemented in kernel 111. In general, any of the above arrangements and/or other arrangements as may be suited for particular implementations to modify time value 133 provided by hypervisor 110 to guest OS 121 in response to system time request 131 in some circumstances, in accordance with the teachings provided herein.

System clock 150 may comprise any mechanism configured to return system time and/or processor cycle count values. In some embodiments, system clock 150 may be implemented as a programmable interval timer that periodically interrupts a processor at computing device 101, wherein the processor then executes a timer interrupt service routine, as will be appreciated by those of skill in the art. In other embodiments, system clock 150 may be implemented using any other approach for keeping track of system time. Read operation 132 may retrieve a system time value from system clock 150. Numerous approaches for read operation 132 are known and/or may be developed by those of skill in the art, and any read operation implementation may be used in conjunction with embodiments of this disclosure.

In some embodiments, SST handler 113 may be configured with predetermined minimum value 114. In general, predetermined minimum value 114 establishes a difference between previously requested system time 115 and current system time 116 for use by SST handler 113. When the difference between previously requested system time 115 and current system time 116 is at or below predetermined minimum value 114, SST handler 113 may be configured to set time value 133 at a value other than current system time 116. When the difference is above predetermined minimum value 114, SST handler 113 may be configured to set time value 133 at current system time 116. For example, when the difference is at or below predetermined minimum value 114, SST handler 113 may be configured to set time value 133 at previously requested system time 115. When the difference is above predetermined minimum value 114, SST handler 113 may be configured to set time value 133 at current system time 116.

In general, predetermined minimum value 114 may be set as appropriate for particular embodiments. Predetermined minimum value 114 may comprise a value determined from appropriate research and consideration of conditions in which embodiments may be deployed. Predetermined minimum value 114 may be referenced or recorded within SST handler 113, and may be updated as appropriate through software updates to SST handler 113. As noted above, for the purpose of preventing cache timing attacks, predetermined minimum value 114 may comprise any amount of time less than a time to process about 10,000 cycles by a processor included at computing device 101. In some embodiments, predetermined minimum value 114 may for example comprise an amount of time in a range of about 0.15 to 0.45 µS. In some embodiments, predetermined minimum value 114 may for example comprise an amount of time in a range of time corresponding to about 750 cycles to about 1250 cycles by a processor at computing device 101.

In some embodiments, SST handler 113 may be configured to perform the following operations in response to system time request 131: request a current system time via read operation 132; store current system time from read operation 132 as current system time 116; compare current system time 116 with previously requested system time 115, e.g., to calculate a difference between current system time 116 and previously requested system time 115 from guest OS 121; compare difference between current system time 116 and previously requested system time 115 with predetermined minimum value 114; determine time value 133 to be returned to guest OS 121 as a function of comparison with predetermined minimum value 114; and/or conditionally reset previously requested system time 115 using current system time 116.

For example, in some embodiments, SST handler 113 may be configured to carry out operations according to the following pseudo code:

```
Read RDTSC
CurrentCount = RDTSC
If CurrentCount - LastCount < CountDelMin
    CurrentCount = LastCount
End
LastCount = CurrentCount
Return CurrentCount
```

In the above example, "Read RDTSC" may comprise an operation to request a current system time, e.g., via read operation 132. "CurrentCount=RDTSC" may comprise an operation to store current system time, e.g., current system time 116 from read operation 132, e.g. by setting the CurrentCount variable to current system time 116. "CurrentCount−LastCount" may comprise an operation to compare current system time 116, as reflected by the CurrentCount variable at this point in the algorithm, with a previously requested system time, e.g., previously requested system time 115, as may be reflected by the LastCount variable at this point in the algorithm. The "LastCount" variable may be retained between RDTSC calls, and may be set to zero when the system timer is started. "CurrentCount−LastCount" may calculate a difference between current system time 116 and previously requested system time 115. "CountDelMin" may comprise a predetermined minimum value, e.g., predetermined minimum value 114.

"If CurrentCount−LastCount<CountDelMin, then CurrentCount=LastCount" may comprise an operation to determine time value 133 to be returned to guest OS 121 as a function of a comparison with predetermined minimum value 114. That is, when the difference between current system time 116 (as reflected by the CurrentCount variable at this point in the algorithm) and previously requested system time 115 (as reflected by the LastCount variable at this point in the algorithm) is less than predetermined minimum value 114 (as reflected by CountDelMin), time value 133 may be determined by modifying the "CurrentCount" variable to equal previously requested system time 115. When the difference between current system time 116 and previously requested system time 115 is less than predetermined minimum value 114, time value 133 may determined by using the unmodified "CurrentCount" variable.

"LastCount=CurrentCount" may comprise an operation to conditionally reset previously requested system time 115 using current system time 116. If the CurrentCount variable was previously set to equal previously requested system time 115 as reflected by the LastCount variable, then the LastCount=CurrentCount operation may leave the previously requested system time 115, as reflected by the LastCount variable, unchanged. If the CurrentCount variable was unmodified from current system time 116, then the LastCount=CurrentCount operation may update the previously requested system time 115, as reflected by the LastCount variable, to equal current system time 116 as reflected by the unchanged CurrentCount variable.

"Return CurrentCount" may comprise an operation to return time value 133 (as reflected by the CurrentCount variable at this point in the algorithm) to guest OS 121.

SST handler 113 may be configured to carry out operations according to the above pseudo code in environments comprising a single guest OS, e.g., guest OS 121, at computing device 101, as well as in environments comprising multiple guest OSs, e.g., guest OSs 121, 122, and 123 at computing device 101. In environments comprising multiple guest OSs, some embodiments may be configured to prevent multiple guest OSs from affecting one another. For example, embodiments may be configured to prevent scenarios in which two different guest OSs each call RDTSC, wherein the calls are separated by an interval shorter than predetermined minimum value 114, and as a result, a same time value 133 may be returned to both guest OSs, potentially introducing an error in the second guest OS.

In some embodiments configured to prevent multiple guest OSs from affecting one another, secure system time reporting may be conducted in connection with second and subsequent system time requests from a same guest OS, while time values returned in response to first system time requests from guest OSs may remain unmodified. For example, in some embodiments, SST handler 113 may be configured to carry out operations according to the following pseudo code, where "getOS_ID" comprises a method that returns a current guest OS identifier:

```
CurrentOS = getOS_ID
CurrentCount = RDTSC
If CurrentCount - LastCount < CountDelMin AND CurrentOS == LastOS
    CurrentCount = LastCount
End
LastCount = CurrentCount
LastOS = CurrentOS
Return CurrentCount
```

Embodiments according to the above pseudo code include the "AND CurrentOS==LastOS" feature, effective to check, by hypervisor 110 and/or SST handler 113, whether previously requested system time 115 was requested by the same guest OS as is currently requesting system time. When previously requested system time 115 was requested by the same guest OS, e.g., by guest OS 121, hypervisor 110 and/or SST handler 113 may be configured to return, to guest OS 121, either previously requested system time 115 or current system time 116 as time value 133 in response to current system time request 131, depending upon whether the difference between current system time 116 and previously requested system time 115 is at or below predetermined minimum value 114, as described herein. However, when previously requested system time 115 was requested by a guest OS other than guest OS 121 making request 131, hypervisor 110 and/or SST handler 113 may be configured to return to guest OS 121 current system time 116 regardless of whether the difference between current system time 116 and previously requested system time 115 is at or below predetermined minimum value 114.

In some embodiments configured to prevent multiple guest OSs from affecting one another, hypervisor 110 may be configured to store different previously requested system times for different guest OSs. Hypervisor 110 may be configured to compare current system time 116 to a previously requested system time for the OS making a current system time request. For example, previously requested system time 115 may comprise previously requested system times for each of guest OSs 121, 122, and 123, and hypervisor 110 may be configured to compare current system time 116 to the previously requested system time requested by guest OS 121.

For example, in some embodiments, previously requested system time 115 may be loaded along with other context information during context switches between guest OSs. In another example, hypervisor 110 and/or SST handler 113 may be configured to include a "LastCountOS_ID" variable to store previously requested system time 115 for guest OSs executing within computing device 101. SST handler 113 may be configured to carry out operations according to the following pseudo code, where "getLastCountOS_ID" may comprise a method configured to return a value stored in the LastCountOS_ID variable, and "putLastCount(OS_ID, LastCount)" may comprise a method configured to write a LastCount value into the LastCountOS_ID variable:

```
CurrentOS = getOS_ID
CurrentCount = RDTSC
LastCount = getLastCount(OS_ID)
If CurrentCount - LastCount < CountDelMin
    CurrentCount = LastCount
End
LastCount = CurrentCount
putLastCount(OS_ID, LastCount)
Return CurrentCount
```

In some embodiments, requesting a current system time via read operation 132 may comprise accessing system clock 150 to read a current system time. Current system time may comprise a system time maintained by system clock 150 on behalf of hypervisor 110. In some embodiments, current system time may correspond to human (calendar) time, time measured by one or more processors or other hardware at computing device 101, network time, or any other clock or timekeeping method. Read operation 132 may access clocks as appropriate to read current times applicable to particular embodiments of this disclosure.

In some embodiments, storing current system time from read operation 132 as current system time 116 may comprise, for example, caching current system time from read operation 132, and/or setting a variable in SST handler 113 equal to current system time 116.

In some embodiments, comparator 117 may be configured to compare current system time 116 with previously requested system time 115, e.g., to calculate a difference between current system time 116 and previously requested system time 115, and to compare the difference with predetermined minimum value 114. In some embodiments, comparator 117 may be configured as an if/then statement as reflected in the above pseudo code example. In some embodiments, comparator 117 may output a "yes" or a "no" output, or a "modify" or a "no modify" output, for example, wherein a "yes" or "modify" output may indicate that current system time 116 is to be modified prior to providing time value 133 to guest OS 121, and wherein a "no" or "no modify" output may indicate that current system time 116 may be provided as time value 133 to guest OS 121.

It will be appreciated with the benefit of this disclosure that comparator 117 may be configured to include or exclude predetermined minimum value 114 in comparison operations. In other words, in some embodiments comparator 117 may be configured to modify time value 133 to a value other than current system time 116 when the difference between previously requested system time 115 and current system time 116 is at or below (i.e., equal to or less than) predetermined minimum value 114, while in some embodiments comparator 117 may be configured to modify time value 133 to a value other than current system time 116 when the difference between previously requested system time 115 and current system time 116 is below (i.e., less than) predetermined minimum value 114.

In some embodiments, SST handler 113 may be configured to determine time value 133 to be returned to guest OS 121 as a function of the comparison performed by comparator 117. For example, SST handler 113 may be configured to set time value 133 to current system time 116 when comparator 117 determines that the difference between current system time 116 and previously requested system time 115 is above predetermined minimum value 114. SST handler 113 may be configured to set time value 133 to a time other than current system time 116 when comparator 117 determines that the difference between current system time 116 and previously requested system time 115 is at or below predetermined minimum value 114.

SST handler 113 may be configured to use any one of a number of techniques for setting time value 133 to a time other than current system time 116. For example, in some embodiments, SST handler 113 may be configured to set time value 133 to previously requested system time 115. In some embodiments, SST handler 113 may be configured to use fuzzy timer techniques to set time value 133. In some embodiments, SST handler 113 may be configured to set time value 133 to a time that is, for example, previously requested system time 115 plus some fixed amount of time. In some embodiments, SST handler 113 may be configured to use any function or formula for use in setting time value 133 to a time other than current system time 116. SST handler 113 may be configured to output time value 133 to kernel 111 and/or guest OS 121 when time value 133 is determined.

In some embodiments, SST handler 113 may be configured to conditionally reset previously requested system time 115 using current system time 116. For example, SST handler 113 may be configured to reset previously requested system time 115 using current system time 116 when current system time 116 is provided to guest OS 121 as time value 133, while SST handler 113 may be configured to not reset previously requested system time 115 when current system time 116 is not provided to guest OS 121 as time value 133. Embodiments may also "unconditionally" reset previously requested system time 115 using current system time 116, for example by resetting previously requested system time 115 using current system time 116 in response to providing any time value 133 to kernel 111/guest OS 121. In some embodiments, SST handler 113 may be configured to reset previously requested system time 115 using time values other than current system time 116, for example by introducing some small amount of "fuzzy" error when resetting previously requested system time 115. In some embodiments, SST handler 113 may be configured to reset previously requested system time 115 periodically without necessarily having received any time request 131.

In some embodiments, SST handler 113 may be configured to include additional operations when determining time value 133 to be returned to guest OS 121. For example, predetermined minimum value 114 may be replaced with one or more ranges of time values in some embodiments. SST handler 113 may be configured to modify time value 133 so as not to include accurate current system time 116 when the difference between current system time 116 and previously requested system time 115 falls within the range(s), and SST handler 113 may be configured to otherwise include current system time 116 in time value 133. In some embodiments, SST handler 113 may be configured to include fuzzy timer outputs in time value 133 when the difference between current system time 116 and previously requested system time 115 falls within some ranges, while including previously requested system time 115 in time value 133 when the difference falls within one or more other ranges, and including current system time 116 in time value 133 when the difference falls within one or more further ranges. Numerous variations and enhancements that rely on predetermined minimum value 114 to determine when or how to modify returned time values may be developed by those of skill in the art with the benefit of this disclosure.

Figure 2:
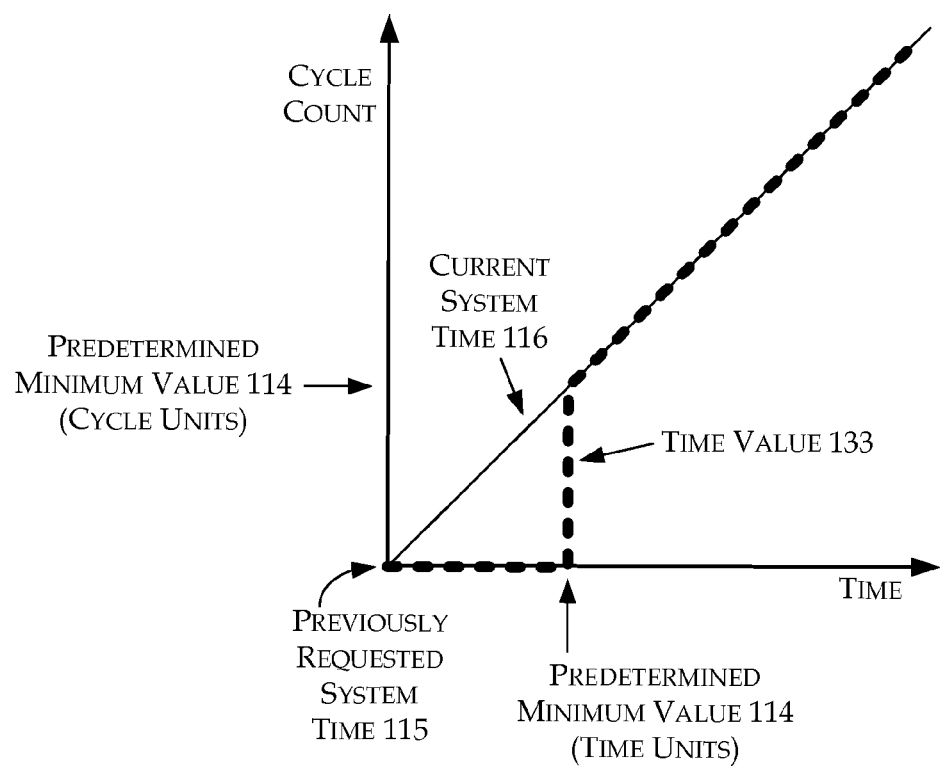
FIG. 2 is a graph illustrating example time values returned as a function of a difference between current system time and previously requested system time.

FIG. 2 is a graph illustrating example time values returned as a function of a difference between current system time and previously requested system time, arranged in accordance with at least some embodiments of the present disclosure. FIG. 2 includes a horizontal time axis and a vertical cycle count axis. The time and cycle count axes intersect at previously requested system time 115. Current system time 116 is illustrated as a line extending diagonally from previously requested system time 115. Predetermined minimum value 114 is illustrated as a point on the time axis, as well as a point on the cycle count axis, to illustrate that predetermined minimum value 114 may comprise time or cycle count units. Time value 133 is illustrated as a bold dashed line which departs from current system time 116 at or below predetermined minimum value 114, and time value 133 is illustrated as equal to current system time 116 above predetermined minimum value 114.

In some embodiments according to FIG. 2, guest OS 121, or any other process, e.g., guest OS 122 or guest OS 123, may make a first system time request at a system time referred to herein as previously requested system time 115. The first request may be made for example by calling RDTSC. A second system time request may be made, e.g., by calling RDTSC by guest OS 121, guest OS 122, or guest OS 123, at any time after previously requested system time 115. When the interval between the second system time request and previously requested system time 115 is at or below predetermined minimum value 114, returned time value 133 may be other than current system time 116, e.g., time value 133 may comprise previously requested system time 115. When the interval between the second system time request and previously requested system time 115 is above predetermined minimum value 114, returned time value 133 may comprise current system time 116. Embodiments according to FIG. 2 may provide for better stability than approaches that modify time value 133 at all times, or for example at times longer than those which may be applied as predetermined minimum value 114.

Figure 3:
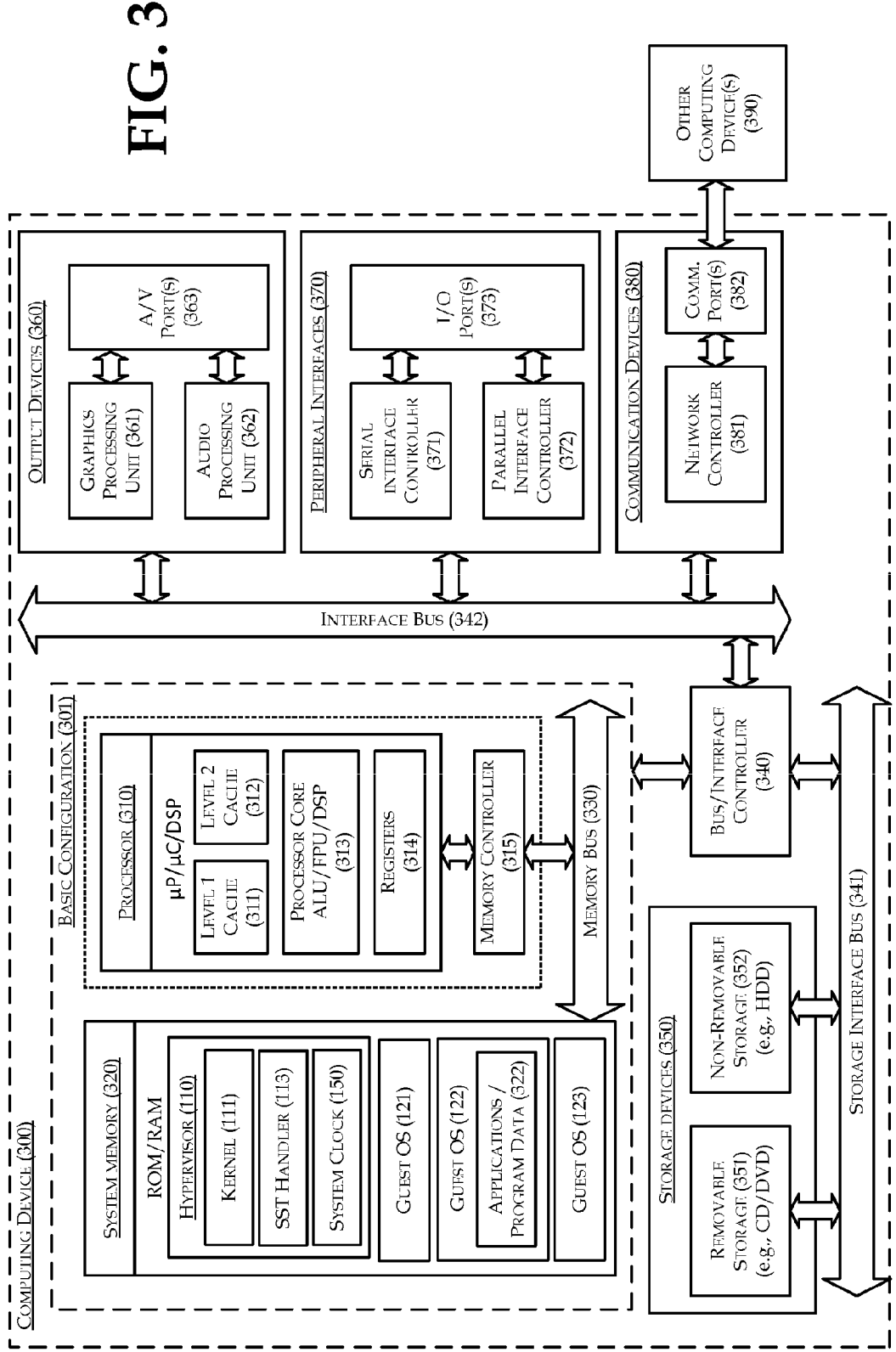
FIG. 3 is a block diagram of a computing device, as one example of the device introduced in FIG. 1.

FIG. 3 is a block diagram of a computing device 300, as one example of the device introduced in FIG. 1, arranged in accordance with at least some embodiments of the present disclosure. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (µP), a microcontroller (µC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 may include hypervisor 110 and one or more guest OSs 121, 122, or 123. Any of guest OSs 121, 122, or 123 may include one or more applications and program data, such as applications/program data 322, illustrated in guest OS 122. Hypervisor 110 may include, for example, kernel 111, SST handler 113, and/or system clock 150 module(s).

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

Level 1 cache 311, level 2 cache 312, system memory 320, removable storage 351, and non-removable storage devices 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363. Example peripheral interfaces 370 may include a serial interface controller 371 or a parallel interface controller 372, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 373. Other conventional I/O devices may be connected as well such as a mouse, keyboard, and so forth. An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a server in a data center. Computing device 300 may also be implemented as any server and/or consumer electronic device. Computing device 300 may also be implemented as a personal or business use computer including both laptop computer and non-laptop computer configurations.

Figure 4:
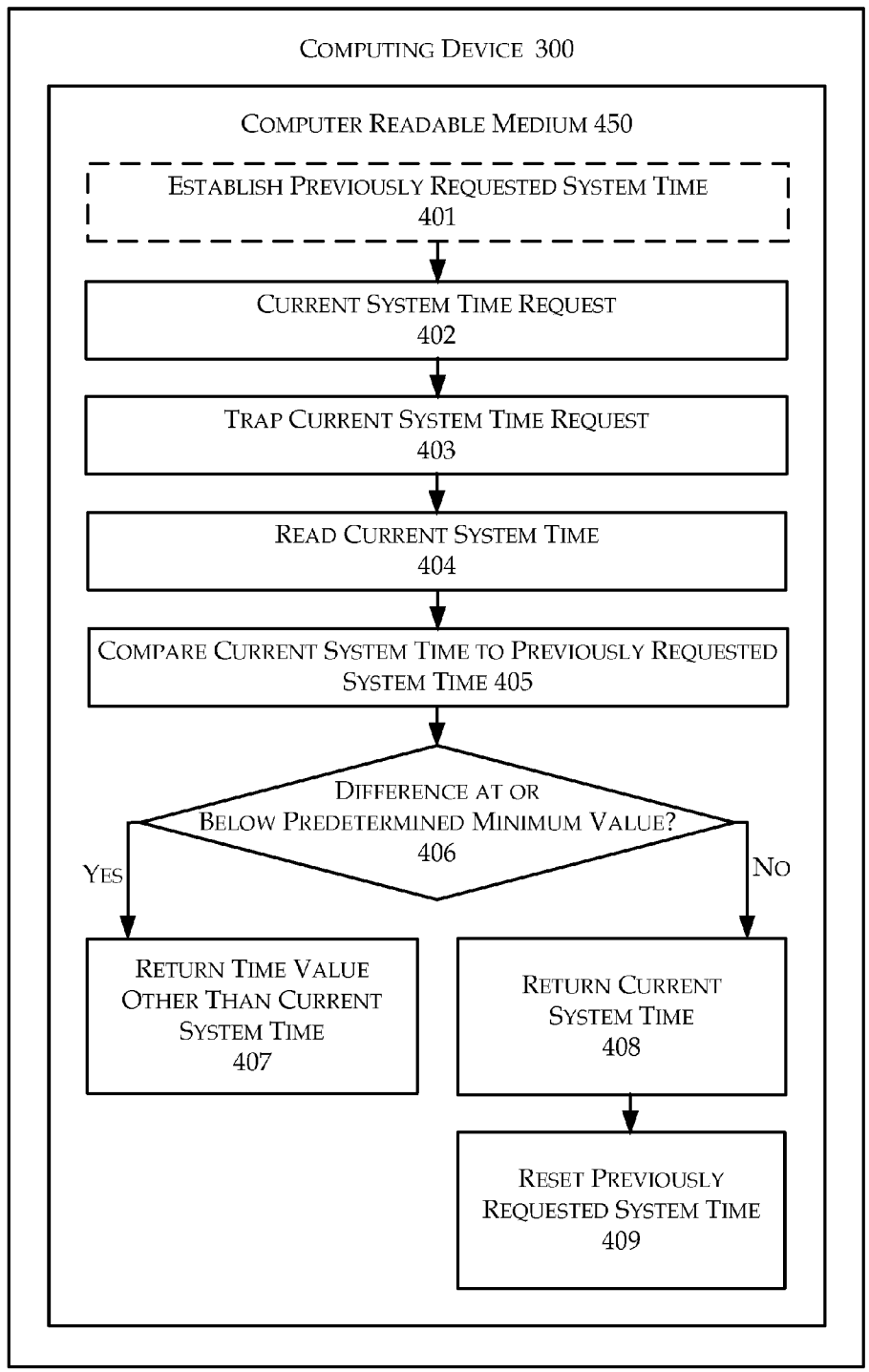
FIG. 4 is a flow diagram illustrating an example method for secure system time reporting by a hypervisor in a computing device.

FIG. 4 is a flow diagram illustrating an example method for secure system time reporting by a hypervisor in a computing device, arranged in accordance with at least some embodiments of the present disclosure. The example flow diagram may include one or more operations/modules as illustrated by blocks 401-409, which represent operations as may be performed in a method, functional modules in a computing device 300, and/or instructions as may be recorded on a computer readable medium 450.

In FIG. 4, blocks 401-409 are illustrated as including blocks being performed sequentially, e.g., with block 401 first and block 407 or 409 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 4 illustrates an example method by which computing device 300, or more particularly, a hypervisor at computing device 300, may perform secure system time reporting in response to system time requests. For simplicity, operations of computing device 300 and/or the hypervisor therein are described as operations of computing device 300. In general, a previously requested system time may be established at block 401, and computing device 300 may perform blocks 402-409 in response to current system time requests. Computing device 300 may receive a current system time request, read current system time and compare the current system time to the previously requested system time. Computing device 300 may return a time value other than the current system time when the difference between the current system time and the previously requested system time is at or below a predetermined minimum value. Computing device 300 may return the current system time when the difference between the current system time and the previously requested system time is above the predetermined minimum value. Computing device 300 may reset the previously requested system time for use with subsequent system time requests.

In some embodiments, methods according to FIG. 4 may be performed conditionally. For example, some embodiments may comprise detecting, by the hypervisor, execution of more than one guest OS at computing device 300, and conducting secure system time reporting according to FIG. 4 when execution of more than one guest OS is detected. Such arrangements may avoid overhead associated with secure system time reporting when the risk of timing attacks is low or absent, while performing secure system time reporting when the risk of timing attacks is present. In embodiments in which computing device 300 is deployed in a data center, secure system time reporting may be selectively activated and deactivated within the data center. For example, some embodiments may comprise detecting, by the hypervisor, execution of guest OSs associated with more than one data center customer at computing device 300, and conducting secure system time reporting when execution of guest OSs associated with more than one data center customer is detected.

At an "Establish Previously Requested System Time" block 401, computing device 300 may establish a previously requested system time for example by storing the previously requested system time value in memory or setting a variable to equal the previously requested system time. Block 401 is illustrated with a dashed line because block 401 may be performed by block 409 under some circumstances.

In some embodiments, when computing device 300 has not received any system time requests, for example when computing device 300 first boots up, a first "previously requested system time" may be "artificially" established at block 401 without having received any actual system time request. In some embodiments, computing device 300 may also periodically set or reset previously requested system time artificially—that is, computing device 300 may set the previously requested system time to a time which does not in fact correspond to any actual system time request. In some embodiments, when computing device 300 has not received any system time requests, methods may be configured to identify the absence of a previously requested system time at block 405 and proceed directly to returning current system time at block 408 (skipping decision block 406), and then establish the previously requested system at block 409, as described below. Block 401 may be followed by block 402.

At a "Current System Time Request" block 402, computing device 300 may receive a current system time request. For example, a guest OS executing on computing device 300 may make the current system time request to the hypervisor, which request may be received at the hypervisor, and therefore at the computing device 300. The current system time request may comprise, for example, a RDTSC or any other form of system time request. It should be emphasized that this disclosure is not limited to guest OS/hypervisor embodiments. Embodiments of this disclosure may be applied to any scenario in which time requests are made by one entity to another. Time requests may comprise inter- as well as intra-device time requests, and may include for example network time requests. Block 402 may be followed by block 403.

At a "Trap Current System Time Request" block 403, computing device 300 may trap the current system time request received at block 402. As is well understood in the computing arts, a trap may result in a switch to kernel mode, wherein the hypervisor may perform some action, such as calling a SST handler in accordance with this disclosure, before returning control to the originating process. For example, hypervisors comprising softtsc type kernels may be configured to trap current system time requests and call the SST handler. Trapping the current time request is one example of a technique to intercept the current time request for the purpose of conditionally modifying a time value that is returned in response to the current time request. Any other technique for intercepting the current time request may be used in some embodiments as appropriate. Block 403 may be followed by block 404.

At a "Read Current System Time" block 404, computing device 300 may read current system time. In embodiments in which the hypervisor maintains system time, block 404 may comprise accessing, by the hypervisor, its own system clock. A module such as the SST handler, which may or may not be considered to form part of the hypervisor itself, may also access the hypervisor system clock in some embodiments. In some embodiments, the SST handler or hypervisor may access other clocks, such as clocks embodied at computing device hardware, in peripheral devices, in other devices in a data center, and/or at network locations. While reading "system" time as that term is understood in the art may be applicable in some embodiments of this disclosure, embodiments that read times other than system times at block 404 are also within the scope of this disclosure. Block 404 may be followed by block 405.

At a "Compare Current System Time to Previously Requested System Time" block 405, computing device 300 may compare the current system time read at block 404 with the previously requested system time established for example at block 401 or block 409. In some embodiments, comparing the current system time to the previously requested system time may comprise calculating a difference between current system time and previously requested system time. For example, the previously requested system may be subtracted from the current system time to calculate the difference. It will be appreciated however that more complex operations may be designed to effectively calculate the difference and that such operations will also fall within the scope of this disclosure. Furthermore, other operations which may or may not comprise subtraction operations per se may be configured to effectively compare current system time to previously requested system time. Block 405 may be followed by block 406.

At a "Difference At or Below Predetermined Minimum Value?" decision block 406, computing device 300 may compare an output from block 404, e.g., a difference value, to the predetermined minimum value. When the comparison indicates that the difference value is equal to or less than the predetermined minimum value, methods according to FIG. 4 may proceed to block 407. When the comparison indicates that the difference value is greater than the predetermined minimum value, methods according to FIG. 4 may proceed to block 408. As noted herein, embodiments may take different approaches for situations in which the output from block 404 is equal to the predetermined minimum value. In some embodiments, as illustrated in FIG. 4, methods may proceed to block 407 when the output from block 404 is equal to the predetermined minimum value. In some embodiments, methods may proceed to block 408 when the output from block 404 is equal to the predetermined minimum value.

The predetermined minimum value may comprise any value and this disclosure is not limited to any particular choice of predetermined minimum value. In some embodiments, the predetermined minimum value may be configured as a minimum value to prevent timing attacks of interest. The predetermined minimum value may therefore be selected to be, for example, just above a range of time values of interest for a timing attack, or for a class of timing attacks. For example, to prevent cache use timing attacks in today's data center servers, the predetermined minimum value may comprise an amount of time in a range of about 0.15 to 0.45 µS, or for example an amount of time in a range of time corresponding to about 750 cycles to about 1250 cycles by a processor at computing device 300.

In some embodiments, the predetermined minimum value may be configured to be at or near a minimum value which is likely to be needed for useful, non-malicious clock access. The predetermined minimum value may therefore be selected to be, for example, just below a range of time values of expected to be returned for a majority of, and up to all of, non-malicious clock accesses. For example, the predetermined minimum value may comprise any amount of time equal to or less than a time to process about 10,000 cycles by a processor at computing device 300. When the predetermined minimum value is measured in processor cycles, the predetermined minimum value may comprise for example any number less than about 10,000 cycles. Decision block 406 may be followed by block 407 or block 408.

At a "Return Time Value Other Than Current System Time" block 407, computing device 300 may return, in response to the current system time request at block 402, a time value other than the requested current system time. Block 407 may therefore provide an "inaccurate" time value in response to the current system time request at block 402. The time value is inaccurate because it is not the current system time as requested. The time value may be determined using any desired technique. In some embodiments, the time value may comprise the previously requested system time. In some embodiments, the time value may be a fuzzy time wherein some random error is combined with the current system time. In embodiments in which the current system time request at block 402 is a guest OS request, block 407 may comprise returning the time value, by the hypervisor to the guest OS. In other settings, block 407 may return the time value to any other requesting entity.

At a "Return Current System Time" block 408, computing device 300 may return the current system time in response to the current system time request at block 402. In embodiments in which the current system time request at block 402 is a guest OS request, block 408 may comprise returning the current system time by the hypervisor to the guest OS. In other settings, block 408 may return current time to any other requesting entity.

In some embodiments, the time value returned at block 408 may be an accurate current system time, e.g., a time that exactly matches the current system time read at block 404. In some embodiments, secure time reporting methods disclosed herein may be used in combination with other secure time reporting methods. For example, fuzzy timer methods may be combined with methods disclosed herein, by providing a previously requested system time at block 407, and providing a fuzzy system time as the time value returned at block 408. Other approaches that combine aspects of this disclosure with other secure system time reporting techniques will be appreciated by those of skill in the art with the benefit of this disclosure. Block 408 may be followed by block 409.

At a "Reset Previously Requested System Time" block 409, computing device 300 may establish a new value for previously requested system time. In some embodiments, computing device 300 may store the current system time returned at block 408 as the new value for previously requested system time. The new value for the previously requested system time may be used in carrying out methods according to FIG. 4 in response to subsequent system time requests. FIG. 4 illustrates block 409 after block 408 but not after block 407. FIG. 4 therefore illustrates conditionally resetting previously requested system time. In some embodiments, methods according to FIG. 4 may perform block 409 after block 407 as well as after block 408. Such embodiments may be referred to herein as unconditionally resetting system time.

Figure 5:
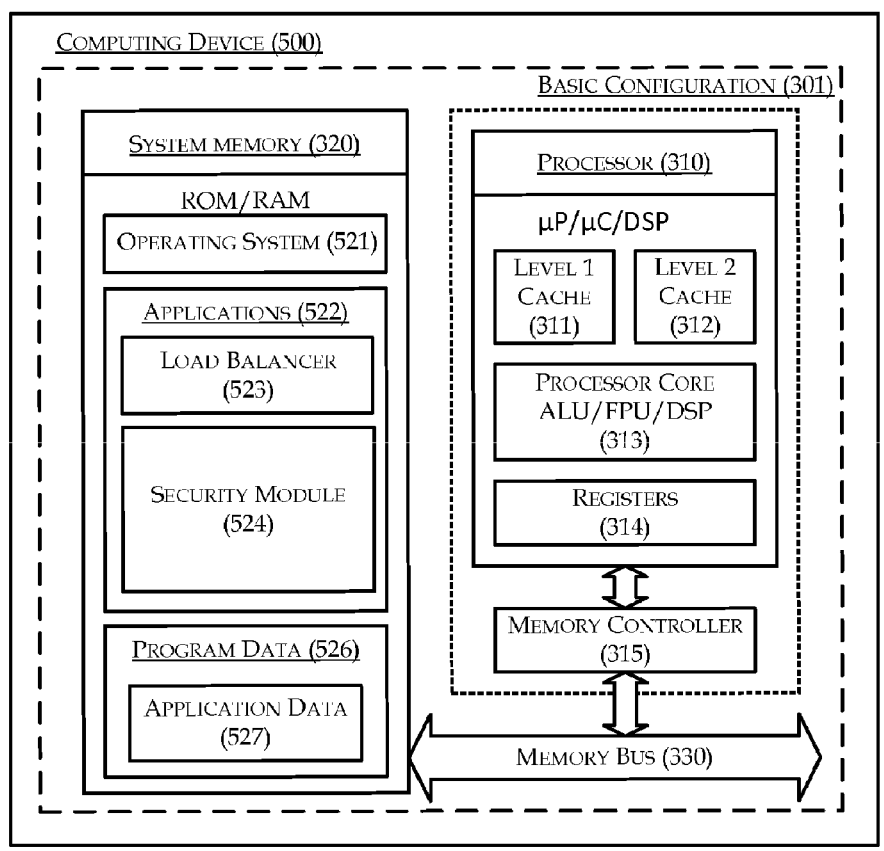
FIG. 5 is a block diagram of a computing device as one example of a data center manager device.

FIG. 5 is a block diagram of a computing device as one example of a data center manager device, arranged in accordance with at least some embodiments of the present disclosure. Devices according to FIG. 5 may generally comprise similar hardware and software to that introduced in connection with FIG. 3, and so aspects of FIG. 3 are omitted from FIG. 5 to avoid redundancy of description. Similar to FIG. 3, in a basic configuration 301, computing device 500 may include one or more processors 310 and a system memory 320. A memory bus 330 may be used for communicating between processor 310 and system memory 320. Elements of processor 310 are introduced in FIG. 3, where like elements are assigned like identifiers.

In data center manager devices according to FIG. 5, system memory 320 may include an OS 521, one or more applications 522, and program data 526. Applications 522 may include a security module 524 and optionally a load balancer 523. Program data 526 may include application data 527 and any other data that may be used by security module 524 and/or load balancer 523.

In some embodiments, data center manager device 500 may be implemented as a server, e.g., a server configured to assign guest OSs to servers within a data center. Data center manager device 500 may be configured to activate and deactivate secure system time reporting in the servers within the data center. In some embodiments, data center manager device 500 may be configured to activate and deactivate secure system time reporting based in part on information including how many guest OSs are assigned to a particular data center server, and/or based in part on information including how many data center customers are associated with guest OSs assigned to a particular data center server.

Load balancer 523 may be configured to perform any of a variety of load balancing techniques known in the art or as may be developed in the future. Load balancer 523 may be configured to launch guest OSs to execute at a server in the data center, and/or to migrate guest OSs among servers in the data center. In choosing a server for a guest OS, load balancer 523 may be configured to account for relative processing loads, performance criteria, security criteria, as well as any other considerations which may be applicable. In accordance with this disclosure, load balancer 523 may be configured to provide guest OS assignment information to security module 524. Guest OS assignment information may comprise, for example, guest OS identifiers along with corresponding server identifiers and/or data center customer identifiers. The corresponding server identifiers may identify servers to which each guest OS is assigned. The corresponding data center customer identifiers may identify data center customers associated with each guest OS.

In some embodiments, security module 524 may be configured to use the guest OS assignment information to determine whether to activate or deactivate secure system time reporting in the servers within the data center. For example, security module 524 may be configured to use the guest OS assignment information to detect execution of multiple guest OSs in a same data center server, and to activate or otherwise configure a hypervisor in the data center server to conduct secure system time reporting when multiple guest OSs are detected. Security module 524 may be configured to use the guest OS assignment information to detect when the data center server no longer executes multiple guest OSs, and to deactivate secure system time reporting within the data center server when multiple guest OSs are no longer executing therein.

In some embodiments, security module 524 may be configured to use guest OS assignment information to detect execution of guest OSs associated with more than one data center customer in a same data center server, and to activate or otherwise configure a hypervisor in the data center server to conduct secure system time reporting when execution of guest OSs associated with more than one data center customer is detected. Security module 524 may be configured to use the guest OS assignment information to detect when the data center server no longer executes guest OSs associated with more than one data center customer, and to deactivate secure system time reporting within the data center server when execution of guest OSs associated with, for example, just one data center customer, or no data center customers, is detected.

In some embodiments, security module 524 may be configured to determine whether to activate or deactivate secure system time reporting in the servers within the data center in response to any other conditions. For example, some guest OSs may be "trusted" while others are "untrusted". Trusted guest OSs may have a security credential or certificate that entitles them to trusted status. In some embodiments, security module 524 may be configured to determine whether to activate or deactivate secure system time reporting for a data center server in response to detecting execution of a trusted/untrusted guest OS at the data center server.

In some embodiments, security module 524 may be configured to send activation/deactivation notifications to a hypervisor in a data center server to activate or deactivate secure system time reporting in the data center server. A hypervisor may contain an SST activator, such as SST activator 112 described in connection with FIG. 1, and the SST activator may be configured to respond to the activation/deactivation notifications.

Figure 6:
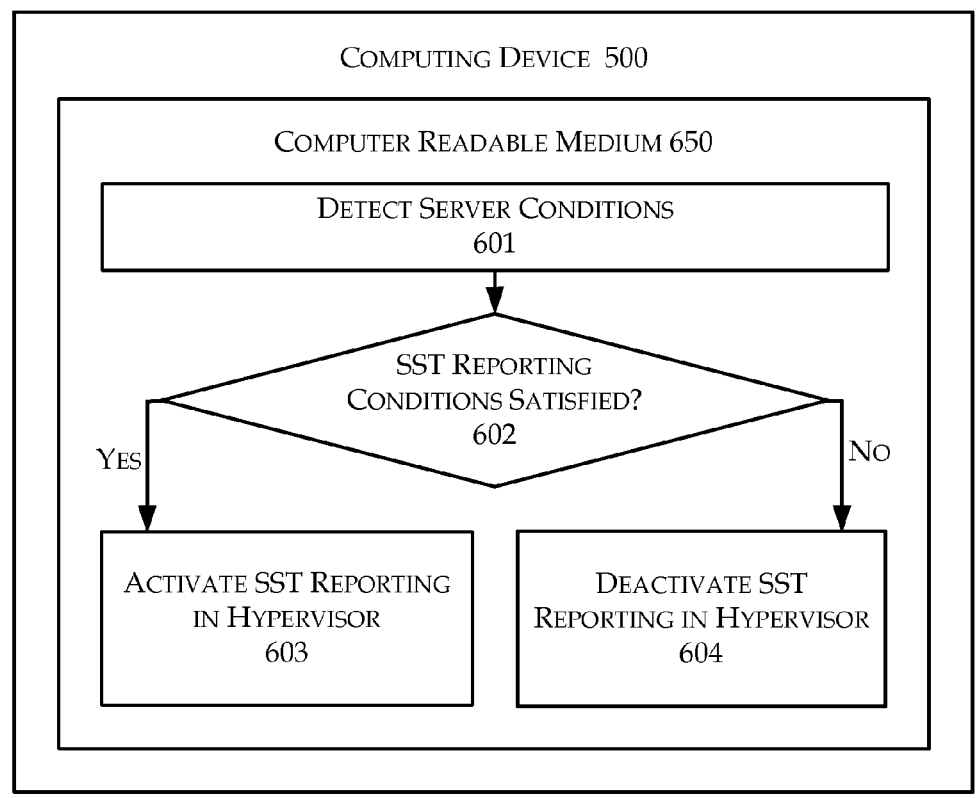
FIG. 6 is a flow diagram illustrating an example method for securing a data center from side channel attacks, all arranged in accordance with at least some embodiments of the present disclosure.

FIG. 6 is a flow diagram illustrating an example method for securing a data center from side channel attacks, arranged in accordance with at least some embodiments of the present disclosure. The example flow diagram may include one or more operations/modules as illustrated by blocks 601-604, which represent operations as may be performed in a method, functional modules in a computing device 500, and/or instructions as may be recorded on a computer readable medium 650.

In FIG. 6, blocks 601-604 are illustrated as including blocks being performed sequentially, e.g., with block 601 first and block 603 or 604 last. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

FIG. 6 illustrates an example method by which data center manager device 500 may secure a data center from side channel attacks by selectively activating and deactivating secure system time reporting in servers within the data center.

At a "Detect Server Conditions" block 601, computing device 500 may detect conditions at one or more servers within the data center. The number of guest OSs executing at the server is one example condition which may be detected. The number of data center customers associated with guest OSs executing at the server is another example condition which may be detected. Any other conditions may be detected as will be appreciated by those of skill in the art with the benefit of this disclosure. In general, conditions relating to security and/or performance of the server may be of interest in determining whether to activate or deactivate secure system time reporting within the server.

In some embodiments, block 601 may be implemented at security module 524 as described in connection with FIG. 5. For example, security module 524 may use guest OS assignment data to detect execution of guest OSs associated with more than one data center customer in a same data center server, or to detect any other server conditions which may be of interest in particular embodiments. Block 601 may be followed by decision block 602.

At a "SST Reporting Conditions Satisfied?" decision block 602, computing device 500 may determine if the conditions detected at block 601 satisfy conditions for activating or deactivating SST reporting at the server. For example, SST reporting conditions may specify SST reporting is activated when guest OSs associated with more than one data center customer execute on a same server, and SST reporting is deactivated when guest OSs associated with one or fewer data center customers execute on the same server. Different or additional SST reporting conditions may be used in different embodiments as appropriate. In some embodiments, multiple SST reporting conditions may be specified, and detection of any of the SST reporting conditions at the server may be sufficient to satisfy the conditions at block 602. In some embodiments, multiple SST reporting conditions may be specified, and detection of all of the SST reporting conditions at the server may be sufficient to satisfy the conditions at block 602. Decision block 602 may be followed by block 603 when the SST reporting conditions are satisfied, or decision block 602 may be followed by block 604 when the SST reporting conditions are not satisfied.

At an "Activate SST Reporting in Hypervisor" block 603, computing device 500 may send an activation notification to the server. The activation notification may be directed to a hypervisor and/or an SST activation module within the server. The activation notification may be effective to configure the server to activate SST reporting at the server, as described in connection with FIG. 1.

At a "Deactivate SST Reporting in Hypervisor" block 604, computing device 500 may send a deactivation notification to the server. The deactivation notification may be directed to a hypervisor and/or an SST activation module within the server. The deactivation notification may be effective to configure the server to deactivate SST reporting at the server, as described in connection with FIG. 1.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as OSs, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically inter-actable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method for secure system time reporting by a hypervisor in a computing device, comprising:
   trapping, by the hypervisor, a current system time request from a guest operating system, the current system time request comprising a request for system time at a system clock at the computing device;
   reading, by the hypervisor, a current system time;
   comparing, by the hypervisor, the current system time to a previously requested system time, wherein the previously requested system time was previously provided by the hypervisor in response to a previous system time request from the guest operating system or another operating system other than the guest operating system, the previous system time request comprising a request for system time at the system clock at the computing device;
   when a difference between the current system time and the previously requested system time is at or below a predetermined minimum value and the previously requested system time was requested by the guest operating system, providing, by the hypervisor to the guest operating system, the previously requested system time in response to the current system time request; and
   when the difference between the current system time and the previously requested system time is above the predetermined minimum value or the previously requested system time was requested by another operating system other than the guest operating system, providing, by the hypervisor to the guest operating system, the current system time in response to the current system time request.

2. The method of claim 1, further comprising:
   detecting, by the hypervisor, execution of more than one guest operating system in the computing device;
   conducting secure system time reporting when execution of more than one guest operating system is detected; and
   deactivating secure system time reporting when execution of more than one guest operating system is not detected.

3. The method of claim 1, wherein the computing device comprises a server in a data center, and further comprising:
   detecting, by the hypervisor, execution of guest operating systems associated with more than one data center customer in the computing device;
   conducting secure system time reporting when execution of guest operating systems associated with more than one data center customer is detected; and
   deactivating secure system time reporting when execution of guest operating systems associated with more than one data center customer is not detected.

4. The method of claim 1, wherein the current system time request comprises a read timestamp command (RDTSC).

5. The method of claim 1, wherein the hypervisor comprises a soft Time Stamp Counter (softtsc) kernel.

6. The method of claim 1, wherein the predetermined minimum value comprises an amount of time in a range of about 0.15 to 0.45 microseconds.

7. The method of claim 1, wherein the predetermined minimum value comprises an amount of time in a range of time corresponding to about 750 cycles to about 1250 cycles by a processor in the computing device.

8. The method of claim 1, wherein the predetermined minimum value comprises an amount of time less than a time to process about 10,000 cycles by a processor in the computing device.

9. The method of claim 1, further comprising storing, by the hypervisor, different previously requested system times for different guest operating systems, and wherein the comparing, by the hypervisor, the current system time to the previously requested system time comprises comparing the current system time to the previously requested system time requested by the guest operating system.

10. A non-transitory computer readable storage medium having computer executable instructions executable by a processor, the instructions that, when executed by the processor, implement a hypervisor configured for secure system time reporting, which causes the processor to:
    trap a current system time request from a guest operating system, the current system time request comprising a request for system time at a system clock at the computing device;
    read a current system time;
    compare the current system time to a previously requested system time, wherein the previously requested system time was previously provided by the hypervisor in response to a previous system time request from the guest operating system or another operating system other than the guest operating system, the previous system time request comprising a request for system time at the system clock at the computing device;
    when a difference between the current system time and the previously requested system time is at or below a predetermined minimum value and the previously requested system time was requested by the guest operating system, provide to the guest operating system the previously requested system time in response to the current system time request; and
    when the difference between the current system time and the previously requested system time is above the predetermined minimum value or the previously requested system time was requested by another operating system other than the guest operating system, provide to the guest operating system the current system time in response to the current system time request.

11. The non-transitory computer readable storage medium of claim 10, further comprising instructions that cause the processor to:
    detect execution of more than one guest operating system by the processor;
    conduct secure system time reporting when execution of more than one guest operating system is detected; and deactivate secure system time reporting when execution of more than one guest operating system is not detected.

12. The non-transitory computer readable storage medium of claim 10, wherein the processor is configured within a server in a data center, and further comprising instructions that cause the processor to:
   detect execution of guest operating systems associated with more than one data center customer in the server;
   conduct secure system time reporting when execution of guest operating systems associated with more than one data center customer is detected; and
   deactivate secure system time reporting when execution of guest operating systems associated with more than one data center customer is not detected.

13. The non-transitory computer readable storage medium of claim 10, wherein the current system time request comprises a read timestamp command (RDTSC).

14. The non-transitory computer readable storage medium of claim 10, wherein the hypervisor comprises a soft Time Stamp Counter (softtsc) kernel.

15. The non-transitory computer readable storage medium of claim 10, wherein the predetermined minimum value comprises an amount of time in a range of about 0.15 to 0.45 microseconds.

16. The non-transitory computer readable storage medium of claim 10, wherein the predetermined minimum value comprises an amount of time in a range of time corresponding to about 750 cycles to about 1250 cycles by the processor.

17. The non-transitory computer readable storage medium of claim 10, wherein the predetermined minimum value comprises an amount of time less than a time to process about 10,000 cycles by the processor.

18. The non-transitory computer readable storage medium of claim 10, further comprising instructions that cause the processor to store different previously requested system times for different guest operating systems, and wherein the comparing the current system time to the previously requested system time comprises comparing the current system time to the previously requested system time requested by the guest operating system.

19. A computing device configured to provide a hypervisor configured for secure system time reporting, comprising:
   a processor;
   a memory; and
   a hypervisor stored in the memory and executable by the processor, wherein the hypervisor is configured to:
      trap a current system time request from a guest operating system, the current system time request comprising a request for system time at a system clock at the computing device;
      read a current system time;
      compare the current system time to a previously requested system time, wherein the previously requested system time was previously provided by the hypervisor in response to a previous system time request from the guest operating system or another operating system other than the guest operating system, the previous system time request comprising a request for system time at the system clock at the computing device;
      when a difference between the current system time and the previously requested system time is at or below a predetermined minimum value and the previously requested system time was requested by the guest operating system, provide to the guest operating system the previously requested system time in response to the current system time request; and
      when the difference between the current system time and the previously requested system time is above the predetermined minimum value or the previously requested system time was requested by another operating system other than the guest operating system, provide to the guest operating system the current system time in response to the current system time request.

20. The computing device of claim 19, wherein the hypervisor is configured to:
   detect execution of more than one guest operating system by the processor;
   conduct secure system time reporting when execution of more than one guest operating system is detected; and
   deactivate secure system time reporting when execution of more than one guest operating system is not detected.

21. The computing device of claim 19, wherein the hypervisor is configured within a server in a data center, and wherein the hypervisor is configured to:
   detect execution of guest operating systems associated with more than one data center customer in the server;
   conduct secure system time reporting when execution of guest operating systems associated with more than one data center customer is detected; and
   deactivate secure system time reporting when execution of guest operating systems associated with more than one data center customer is not detected.

22. The computing device of claim 19, wherein the current system time request comprises a read timestamp command (RDTSC).

23. The computing device of claim 19, wherein the hypervisor comprises a soft Time Stamp Counter (softtsc) kernel.

24. The computing device of claim 19, wherein the predetermined minimum value comprises an amount of time in a range of about 0.15 to 0.45 microseconds.

25. The computing device of claim 19, wherein the predetermined minimum value comprises an amount of time in a range of time corresponding to about 750 cycles to about 1250 cycles by the processor.

26. The computing device of claim 19, wherein the predetermined minimum value comprises an amount of time less than a time to process about 10,000 cycles by the processor.

27. The computing device of claim 19, wherein the hypervisor is configured to store different previously requested system times for different guest operating systems, and wherein the comparing the current system time to the previously requested system time comprises comparing the current system time to the previously requested system time requested by the guest operating system.

* * * * *